No. 635,002. Patented Oct. 17, 1899.
A. H. SHIPPEE.
CULTIVATOR.
(Application filed Feb. 24, 1899.)
(No Model.)
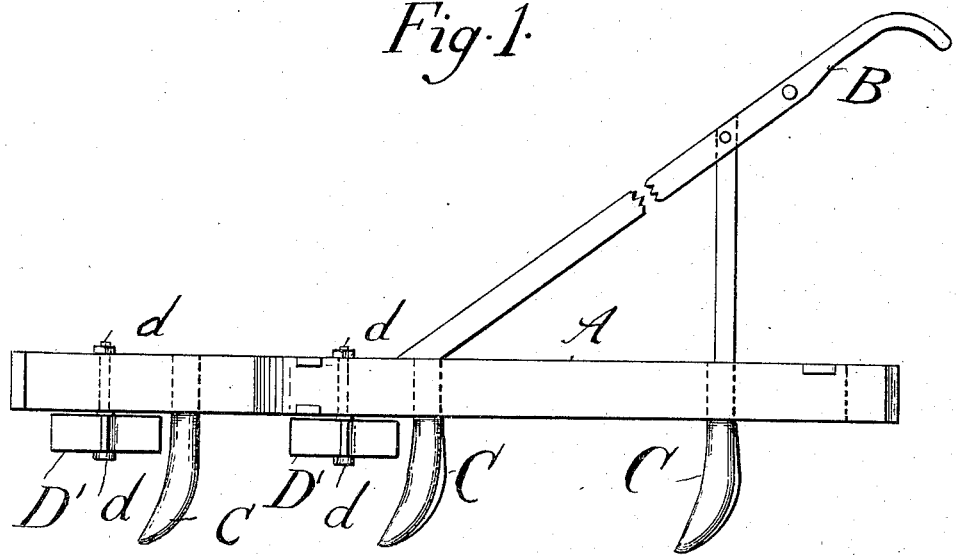
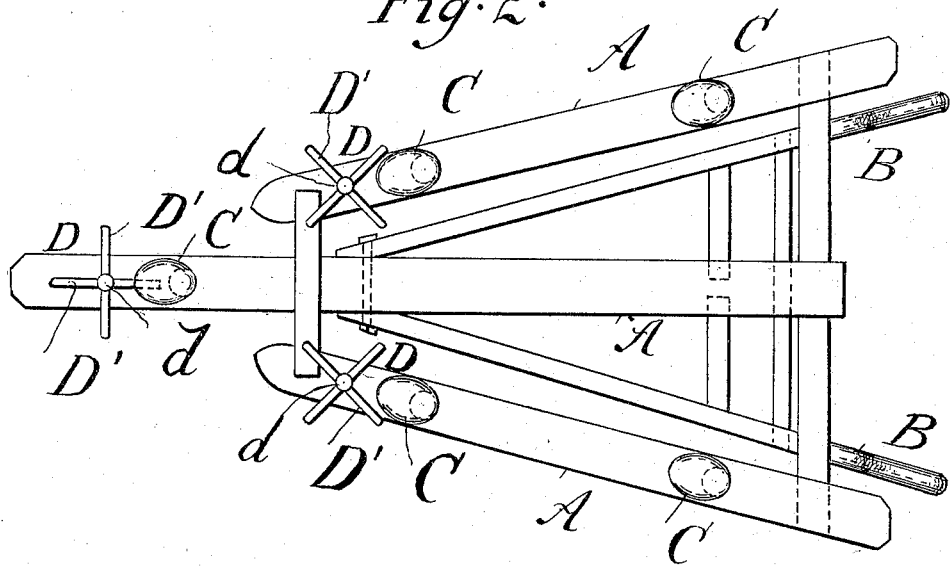
WITNESSES
INVENTOR
Albert Henry Shippee,
BY
ATTORNEYS

UNITED STATES PATENT OFFICE.

ALBERT HENRY SHIPPEE, OF KILLINGLY, CONNECTICUT.

CULTIVATOR.

SPECIFICATION forming part of Letters Patent No. 635,002, dated October 17, 1899.

Application filed February 24, 1899. Serial No. 706,647. (No model.)

*To all whom it may concern:*

Be it known that I, ALBERT HENRY SHIPPEE, a citizen of the United States, and a resident of East Killingly, county of Windham, and State of Connecticut, have invented certain new and useful Improvements in Cultivators, of which the following is a specification, reference being had to the accompanying drawings, forming a part thereof, in which similar letters of reference indicate corresponding parts.

This invention relates to improvements in cultivators, the object thereof being to provide a means for automatically cleaning the cultivator-teeth to prevent accumulation of moist sod and weeds thereon during the process of cultivating the ground, whereby the cultivator is maintained in a clean and operative condition for performing efficacious service.

The invention will be hereinafter fully described, and specifically set forth in the annexed claims.

In the accompanying drawings, forming part of this specification, Figure 1 is a side elevation of my improved device, and Fig 2 is an inverted plan view thereof.

In the practice of my invention I employ a cultivator of any adapted construction comprising a frame A, handles B, and a plurality of teeth C. Located in front of the teeth and depending from the framework by means of spindles $d$ are rotary scrapers D, which comprise, respectively, a plurality of radially-extended knives or blades D'. These scrapers revolve loosely upon the spindles $d$, so that contact with clods of earth will readily rotate them.

In the operation and use of the device the cultivator is forced over the loose ground in the customary manner, and it is obvious that the continuous automatic rotary motion of the scrapers will keep the teeth in a clean condition and prevent accumulation of loose sods, weeds, &c., thereon, thus rendering the cultivator capable of doing efficacious work and preventing the formation of deep furrows, which is frequently the result of adding the weight of moist sod and earth to the cultivator-teeth.

Having thus described my invention, what I claim as new, and desire to secure by Letters Patent, is—

1. The combination with a cultivator comprising a frame having the downwardly-projecting vertical spindles, and the teeth C, just in rear of said spindles, the rotary scrapers D, loosely mounted upon said spindles in front of the respective cultivator-teeth and adapted to revolve automatically by contact with clods of sod while the cultivator is being operated, said scrapers respectively comprising a plurality of radially-projecting blades extending on a horizontal plane, substantially as shown and described.

2. The combination with a cultivator, comprising a frame having the downwardly-projecting vertical spindles $d$, and the teeth C just in rear of said spindles, of the rotary scrapers D, loosely mounted upon said spindles, said scrapers respectively comprising a plurality of radially-projecting blades extending on a horizontal plane, and the relative arrangement and construction being such that the outer ends of said horizontal blades swing within the front face of the top portion of the teeth, substantially as shown and described.

In testimony that I claim the foregoing as my invention I have signed my name, in presence of two witnesses, this 20th day of February, 1899.

ALBERT HENRY SHIPPEE.

Witnesses:
 LUCIE A. SHIPPEE,
 CARRIE L. WOOD.